3,300,492
VAPORIZING UREA IN THE PRODUCTION OF MELAMINE

Guenther Hamprecht, Limburgerhof, Pfalz, Ludwig Vogel, Frankenthal, Pfalz, Matthias Schwarzmann, Limburgerhof, Pfalz, and Rudolf Mohr, Ludwigshafen (Rhine), Germany, assignors to Badische Anilin- & Soda-Fabrik Aktiengesellschaft, Ludwigshafen (Rhine), Germany
No Drawing. Filed Mar. 23, 1965, Ser. No. 442,175
Claims priority, application Germany, Mar. 28, 1964, B 76,108
6 Claims. (Cl. 260—249.7)

This invention relates to the production of melamine by thermal catalytic treatment of urea, and it relates particularly to vaporizing the urea required for the synthesis.

It is known that in the production of melamine, urea may be vaporized in a first stage at temperatures above about 320° C. and the cracked product may be reacted in a second stage at temperatures of about 330° to 450° C. in the presence of catalysts to form melamine and the latter may be separated from the escaping off-gas, for example by condensation.

For carrying out this process it is important that it should be possible to vaporize the urea completely in the first stage. It is known that cyanuric acid, ammelide and other triazines form from urea at temperatures of 180° to 320° C. Good yields of cyanic acid are only obtained above 320° C. For satisfactory vaporization of the urea it is essential that the cracked gas formed should be removed rapidly from the vaporization zone because otherwise residues which are very stable thermally, particularly melem and melon, readily form under the influence of the cracked products of urea.

A number of methods have already been described for vaporizing urea. Thus it is known that urea may be introduced in molten form together with ammonia as a carrier gas into the upper portion of a cylindrical tube which is filled to a certain height with steel lamellae, the heat required for vaporization being supplied from outside. To ensure a satisfactory vaporization of the urea, the cross-section of the vaporizing tube should not be too large. Otherwise in order to provide the amount of heat required for the vaporization it is necessary to maintain high temperatures at the walls which favor the formation of deposits on the vaporizer surfaces. To vaporize urea in industrial amounts it is therefore necessary to use a large number of tubes having small cross-sections, but this involves a very complicated system of urea metering equipment which is very liable to disturbance.

It is also known that urea may be vaporized by introducing it into alkali metal cyanate melts which serve as a heat transfer medium. The formation of melem and melon is also unavoidable in this case so that the melt must be treated with water or alkali metal carbonate from time to time to remove these products.

Another prior art proposal is that urea should be vaporized in a fluidized bed, ammonia being used as the fluidizing gas. The formation of residues is said to be avoided by the use of certain inert fluidized materials. This method requires considerable amounts of ammonia and, after the melamine has been separated, it is necessary to separate the ammonia from the off-gas if the method is to be made economical.

It is an object of this invention to provide a process for the vaporization of urea wherein the formation of thermally stable residues is avoided.

We have found that urea can be vaporized for the production of melamine by treatment of urea at temperatures of from 350° to 550° C. in a first stage and reaction of the cracked gas formed in a second stage in the presence of catalysts at temperatures of 330° to 450° C. without the said disadvantages by vaporizing the urea in the first stage in finely divided form by direct heat exchange with the cracked gas heated to temperatures of 350° to 550° C. from the first stage or the off-gas freed from melamine of the second stage.

The process may be carried out for example in a packed column having any cross-section, urea being introduced in finely divided form at the upper end of the packed column, for example through a nozzle, and cracked gas or off-gas which has been heated up to temperatures of 350° to 550° C., preferably 400° to 550° C., also being introduced into the upper part of the column. It is essential that the gas velocity or, in other words, the amount of gas supplied per unit of time, and the temperature of the gas should be so correlated to the height of the vaporizer that the whole of the urea has been vaporized by the time it reaches the bottom of the column. An empty vertical vaporizing tube may be used instead of a packed column with the same results. To avoid heat loss, the vaporizer may be insulated. Furthermore the vaporizer may be provided with additional external heating means.

It is surprising that while maintaining the conditions according to this invention it is possible to vaporize urea completely, for it would have been expected that returning the cracked gas leaving the first stage or the off-gas leaving the second stage would favor the formation of residues.

The invention is further illustrated by the following examples.

Example 1

2400 cu. m. (S.T.P.) of a gas mixture consisting of ammonia and cyanic acid (such as is formed by vaporizing urea) is introduced per hour into the upper portion of a cylindrical tube having a height of 5 m. and a width of 0.9 m. The rate of flow of the gas is about 3 m./sec. 250 kg. per hour of urea is injected in a state of fine division, also into the upper portion of the tube. At the bottom of the column, the gas mixture, at a temperature of 370° C., is withdrawn and an amount equal to that originally introduced into the vaporizer is separated and reintroduced into the upper portion of the vaporizer, while the remainder of the gas is reacted in a reactor charged with catalyst at a temperature of about 350° C. to form melamine. The gas mixture introduced into the vaporizing tube is heated in a heat exchanger to a temperature of 475° C. prior to reintroduction into the tube. The vaporizer can be operated for several weeks without encrustations being formed.

Example 2

Following the procedure of Example 1, 2400 cu. m. (S.T.P.) per hour of a gas mixture of ammonia and cyanic acid is recycled through a heat exchanger and a vaporizing column. The vaporizing column is 1.5 m. in height and has a diameter of 0.75 m. 250 kg. of liquid urea is sprayed per hour into the upper part of the column. The vaporizer is filled to a height of 1 m. with solid pieces of aluminum about 10 mm. in length as tower packing. A gas mixture at a temperature of 370° C. is withdrawn at the bottom of the column and, after the amount of gas originally introduced into the column has been branched off, introduced into a reactor charged with catalyst in which the cracked gas is reacted to form melamine.

Example 3

1700 cu. m. (S.T.P.) of an off-gas (obtained in the synthesis of melamine and consisting of 66.8% by volume of ammonia, 33% by volume of carbon dioxide and 0.2% by volume of cyanic acid) is preheated per hour to 550° C. in a heat exchanger and used continuously for vaporizing 250 kg. of urea per hour as described in Example 2. The gas mixture formed leaves the vaporizer at a temperature of 330° C.

We claim:

1. A process for vaporizing urea for the production of melamine by the thermal cracking of urea at temperatures of from 350° to 550° C. in a first stage, reaction of the cracked gas in a second stage in the presence of a catalyst at a temperature of 330° to 450° C. and separating melamine from the off-gas, wherein the urea is vaporized in the first stage in a finely divided form by direct heat exchange with cracked gas from the first stage heated up to a temperature of 350° to 550° C.

2. A process as claimed in claim 1 wherein the cracked gas is introduced at a temperature of 400° to 550° C. into the upper portion of a packed column and finely divided urea is also introduced into the upper portion of the column.

3. A process as claimed in claim 1 wherein a portion of the cracked gas is branched off, heated to a temperature of 350° to 550° C. and recycled to the first stage of the process.

4. A process for vaporizing urea for the production of melamine by the thermal cracking of urea at temperatures of from 350° to 550° C. in a first stage, reaction of the cracked gas in a second stage in the presence of a catalyst at a temperature of 330° to 450° C. and separating melamine from the off-gas, wherein the urea is vaporized in the first stage in a finely divided form by direct heat exchange with off-gas from the second stage which has been freed from melamine and which is heated up to a temperature of 350° to 550° C.

5. A process as claimed in claim 4 wherein the off-gas is introduced at a temperature of 400° to 550° C. into the upper portion of a packed column and finely divided urea is also introduced into the upper portion of the column.

6. A process as claimed in claim 4 wherein a portion of the off-gas is branched off, heated to a temperature of 350° to 550° C. and recycled to the first stage of the process.

References Cited by the Examiner

UNITED STATES PATENTS

| | | | |
|---|---|---|---|
| 3,095,416 | 8/1963 | Crowley et al. | 260—249.7 |
| 3,239,522 | 3/1966 | Cook et al. | 260—249.7 |

WALTER A. MODANCE, *Primary Examiner.*

JOHN M. FORD, *Assistant Examiner.*